United States Patent [19]

Burr

[11] Patent Number: 4,604,107

[45] Date of Patent: Aug. 5, 1986

[54] LOW TEMPERATURE SEPARATION OF FLUIDS BY FORMATION OF PHASES HAVING DIFFERENT DENSITIES

[75] Inventor: Peter S. Burr, Munich, Fed. Rep. of Germany

[73] Assignee: Linde Aktiengesellschaft, Wiesbaden, Fed. Rep. of Germany

[21] Appl. No.: 669,974

[22] Filed: Nov. 9, 1984

[30] Foreign Application Priority Data

Nov. 10, 1983 [DE] Fed. Rep. of Germany ....... 3340631

[51] Int. Cl.[4] ............................................. B01D 5/00
[52] U.S. Cl. ........................................ 55/17; 55/27; 55/48; 55/73
[58] Field of Search .................. 55/17, 23, 27, 40, 48, 55/49, 73; 423/220, 244

[56] References Cited

U.S. PATENT DOCUMENTS

| | | | |
|---|---|---|---|
| 2,490,454 | 12/1949 | Myers | 55/23 |
| 2,863,527 | 12/1958 | Herbert et al. | 55/73 X |
| 3,001,373 | 9/1961 | Eastman et al. | 62/17 |
| 3,116,987 | 1/1964 | Honerkamp et al. | 55/48 X |
| 3,398,544 | 8/1968 | Crownover | 62/12 |
| 3,753,335 | 8/1973 | Morris | 55/29 |
| 3,764,665 | 10/1973 | Groenendaal et al. | 55/73 X |
| 3,899,312 | 8/1975 | Kruis et al. | 55/73 X |
| 3,926,591 | 12/1975 | Wildmoser et al. | 55/73 X |
| 4,038,332 | 7/1977 | Carter | 55/48 X |
| 4,043,770 | 8/1977 | Jakob | 55/73 X |
| 4,115,079 | 9/1978 | Pockrandt et al. | 55/73 X |
| 4,371,381 | 2/1983 | Schuftan | 55/73 X |
| 4,522,638 | 6/1985 | Karwat | 55/73 X |

FOREIGN PATENT DOCUMENTS

| | | |
|---|---|---|
| 1252030 | 1/1959 | France . |
| 898732 | 6/1962 | United Kingdom . |
| 918479 | 2/1963 | United Kingdom . |
| 1516924 | 7/1978 | United Kingdom . |
| 2118287 | 10/1983 | United Kingdom . |

OTHER PUBLICATIONS

Semyenova, T. A. and I. L. Leites, Moscow, "Kimiya" publishing house, 1977, Cleaning of Technological Gases.

Primary Examiner—Robert Spitzer
Attorney, Agent, or Firm—Millen & White

[57] ABSTRACT

For the separation of fluid mixtures, the mixture is cooled sufficiently to form more than two phases of differing densities, and especially two liquid phases. The individual phases are then separated in correspondence with their densities. The process is especially applicable as a pretreatment in the absorptive removal of sour gases from gaseous mixtures as well as in the regeneration of a solvent loaded with gaseous impurities.

14 Claims, 4 Drawing Figures

LOW TEMPERATURE SEPARATION OF FLUIDS BY FORMATION OF PHASES HAVING DIFFERENT DENSITIES

BACKGROUND OF THE INVENTION

This invention relates to a process for the separation of gaseous and/or liquid mixtures, and in particular to a system incorporating a cooling step which leads to the formation of separable phases having different densities, and which is especially applicable to the treatment of sour gases.

The separation of sour gases, understood to mean essentially $CO_2$, $H_2S$, and mercaptans, is a process step that is frequently necessary in the processing of raw gas streams. Of such sour gas species which must be isolated from downstream facilities due to their corrosive and catalyst-damaging properties, $CO_2$ and $H_2S$ occur most frequently, and generally in significant concentrations, e.g., in natural gas or cracked gases. Removal of the sour gases can be conducted in various ways. Absorption methods—of a chemical as well as physical nature—have proven to be extremely effective. The scrubbing steps are usually conducted in such a way that the solvent, loaded with the sour gases, is regenerated and reused. In order to keep the efficiency of the scrubbing process at a maximum, regeneration must be performed usually up to an almost complete separation of the sour gases from the solvent. As a result, substantial costs are associated with the heating and recycling of the solvent a well as for make-up solvent. Furthermore, a large in-process and storage inventory of the solvent is a significant economic factor, especially where the solvent is expensive.

Distillation methods are also employed for separating the mixtures that consist mostly of methane, lower hydrocarbons and the sour gases. However, problems are encountered in many cases in these methods in the freezing out of the sour gas components.

SUMMARY OF THE INVENTION

An object of one aspect of this invention, therefore, is to provide an improved process and associated apparatus for the separation of gaseous and/or liquid mixtures.

Upon further study of the specification and appended claims, further objects and advantages of this invention will become apparent to those skilled in the art.

According to one aspect of this invention, an improved process is obtained by cooling a fluid sufficiently to form a multiphase mixture of varying densities, especially of at least two liquid phases, and separating the individual phases in correspondence with their densities. The process of this invention is applicable to all types of gaseous mixtures exhibiting multiphase behavior, as well as to gas-liquid mixtures.

The cooling step of this invention causes the formation of normally two liquid phases, one vapor phase, and in some cases a solid phase. The degree of cooling in this connection is dependent on the chemical composition of the mixtures to be separated and on their physical properties, respectively.

Cooling can be performed by means of external refrigeration and/or in heat exchange with fractions obtained during the expansion of product streams. Generally, the cooling of the mixture will be conducted in a single stage, but there is also the possibility of utilizing multistage cooling. In this context, all phases can be subjected to further cooling or, after each stage, only specific phases can then be further cooled, selected in correspondence with their density.

In a preferred embodiment of the process of the invention, the individual phases, in correspondence with their composition, are obtained as product streams and/or are conducted to further separating and/or purification processes. Accordingly, depending on the purity requirements of a product stream, a phase can be obtained directly as a product stream or, alternatively, after "prepurification" by the process of this invention, can be subjected to another purification and/or separation step.

The process of this invention is of special significance as a "prepurification" stage. Thus, according to another especially prepared embodiment, the present invention is utilized in conjunction with a process of the absorptive separation of gaseous mixtures, comprising cooling the mixture before the scrubbing step, and introducing the phases obtained during cooling into the scrubbing process, for the one part, and obtaining them as product streams, for the other part. Especially for the absorptive removal of sour gases, particularly $CO_2$ and $H_2S$, from gaseous mixtures containing same, it is suggested to cool the gaseous mixture before the scrubbing step to form multiphases according to the invention, and then to withdraw separately: (a) a phase depleted in sour gases having a low density, (b) a phase greatly enriched with sour gases having a higher density, and (c) a phase containing sour gases having a still higher density; and to recycle at least one phase of a higher density, for example medium density, into the scrubbing process. There is also the possibility of conducting the fraction low in sour gases and the fraction greatly enriched with sour gases likewise into the scrubbing process. In contrast, if the design conditions are such that a minor concentration of sour gases in the product stream is tolerable, then, according to this invention, the phase depleted in sour gases can be obtained directly as the product stream.

Furthermore, a phase of higher density, in case of the presence of a large content of sour gases, especially $H_2S$, can suitably be directly further treated, for example in a sulfur manufacturing plant based on the Claus process.

The process proposed by this invention can be utilized not only as a prepurification stage for subsequent purification and separation procedures, respectively, but also for the regeneration of a solvent loaded with gaseous impurities. Thus, in accordance with another process aspect of this invention, at least a portion of the loaded solvent is subjected to cooling to obtain: (a) a phase containing almost no solvent and having a lower density, (b) a phase of higher density, containing primarily the gaseous impurities and only a little solvent, and (c) a phase of a still higher density, containing primarily solvent. Each phase is separately withdrawn and at least one phase of higher density, for example medium density, is subjected to a further regeneration. In this process, the phase having lower density, which is almost free of solvent, can be obtained directly as the product stream. In this context, product stream is understood to mean a gaseous stream consisting, essentially of, for example $CO_2$ and/or $H_2S$ which can be conducted for further processing optionally into a sulfur manufacturing plant.

Suitably, the phase of still higher density, comprised primarily of solvent, is directly recycled into the scrubbing process without further regeneration. In this way, a two-stage solvent regeneration can be performed by means of the process of this invention, obtaining a first solvent stream still having traces of gaseous impurities and a second solvent stream completely regenerated in a further treatment stage.

According to another embodiment of the process of this invention, the loaded solvent is expanded prior to cooling, and the resultant gaseous fraction is cooled together with part of the liquid fraction, normally 2–10%, preferably 2–5%. Prior to expansion, the solvent can be additionally heated somewhat; during this step, a portion of the gaseous impurities is already transferred into the gaseous fraction. The residual liquid fraction can then, in this case, be directly subjected to a regenerating step.

It is well understood that the two versions of the process of this invention, namely the prepurification of a gaseous mixture and the regeneration of a solvent, can also be utilized simultaneously, in which case the process can be applied not only as prepurification method but also in general as a purification treatment.

DETAILED DESCRIPTION OF THE DRAWINGS

Figure 1:
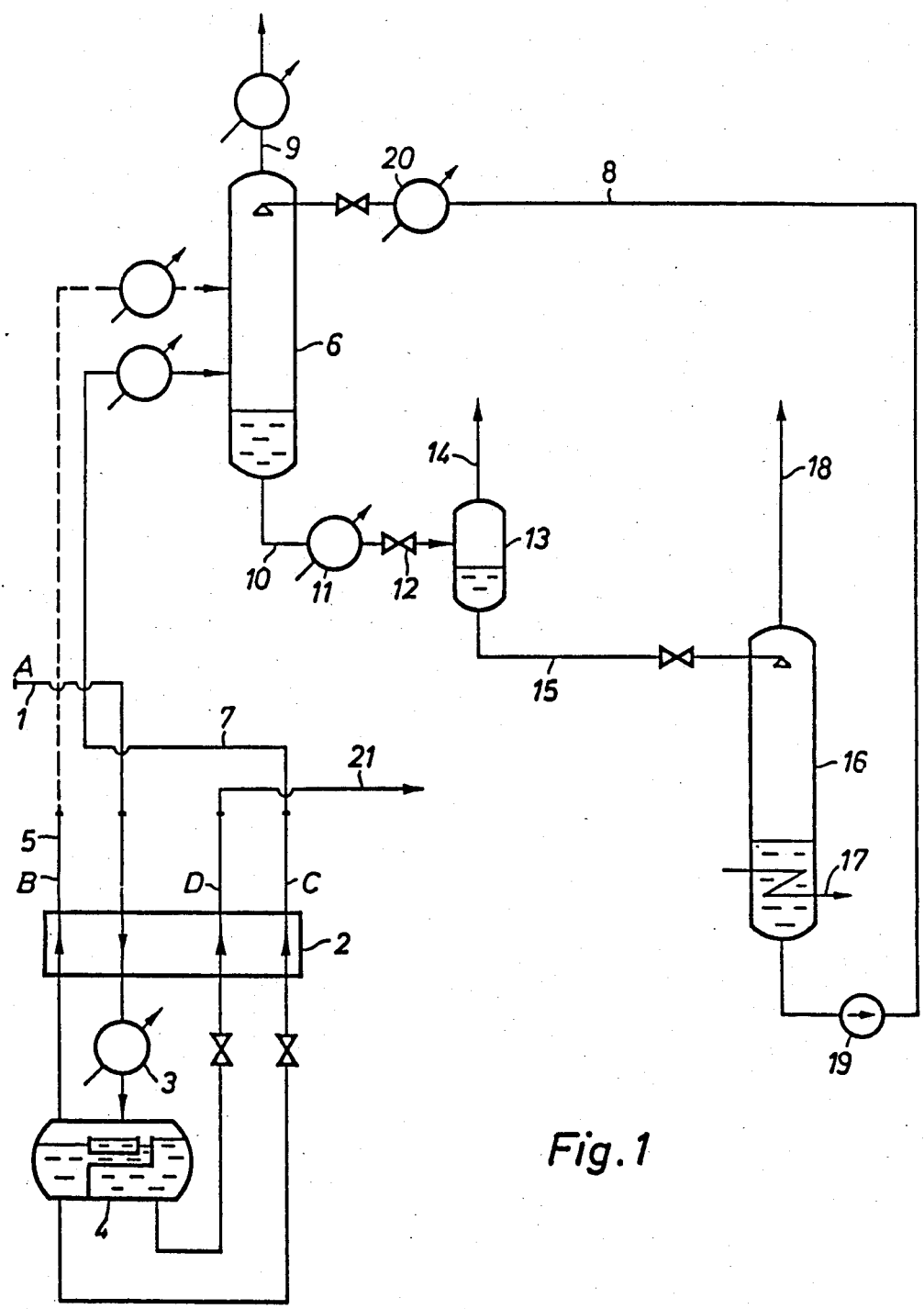
FIG. 1 is a schematic flowsheet of a preferred process scheme for "prepurification".

According to FIG. 1, a raw gas stream A is introduced via conduit 1 under a pressure of 40 bar and at a temperature of 300 K. The gaseous stream is cooled in a heat exchanger 2 and in a cooler 3 to about 195 K. According to FIG. 2, separation of the raw gas stream A takes place at this temperature into three phases B, C and D, exhibiting the following compositions and densities.

|   | A | B | C | D |
|---|---|---|---|---|
| $CH_4$ | 50 | 95 | 79 | 17 |
| $CO_2$ | 40 | 2 | 12 | 69 |
| $H_2S$ | 10 | 3 | 9 | 14 |
| Density ($kg/m^3$) |  | 70 | 400 | 900 |

These phases are separated in a phase separator 4 on the basis of their differing densities, in some cases expanded to a lower temperature, and thereafter heated in heat exchanger 2. Phases B and C can be further treated, if necessary, in a subsequent scrubbing step. For this purpose, phase B is introduced via conduit 5 into approximately the middle of a scrubbing column 6, and phase C is conducted via conduit 7 into the lower section thereof. By way of conduit 8, a solvent is fed in the upper zone of scrubbing column 6, this solvent absorbing the residual traces of sour gases from the rising gaseous stream. Accordingly, methane free of sour gases can be withdrawn overhead via conduit 9.

Via conduit 10, the solvent loaded with the sour gases is removed from the sump of scrubbing column 6, heated in 11, expanded in 12, and introduced into a phase separator 13. The fraction separated in the gaseous form, consisting essentially of dissolved methane, can be withdrawn from separator 13 via conduit 14 and obtained as a product. The solvent, now containing merely the sour gases, is introduced via conduit 15 into a regenerating column 16 and freed of the sour gases by heating in 17. These sour gases are removed from the regenerating column overhead via conduit 18. The regenerated solvent is removed from the sump of regenerating column 16, and recycled via pump 19, conduit 8 and cooler 20 to the scrubbing column 6.

Phase D can also be freed of the sour gases in the same manner. However, it is likewise possible to conduct this phase, if enriched with $H_2S$, directly via conduit 21 to a Claus reactor for conversion into elemental sulfur.

It is moreover possible to obtain phase B directly as a product stream, depending on the product purity requirements instead of being passed to the scrubbing column.

Accordingly, when fraction B and/or D are not scrubbed, the process of this invention considerably reduces the amount of solvent to be utilized, and concomitantly the energy consumption for recycling the regenerated solvent and the regeneration thereof.

Figure 2:
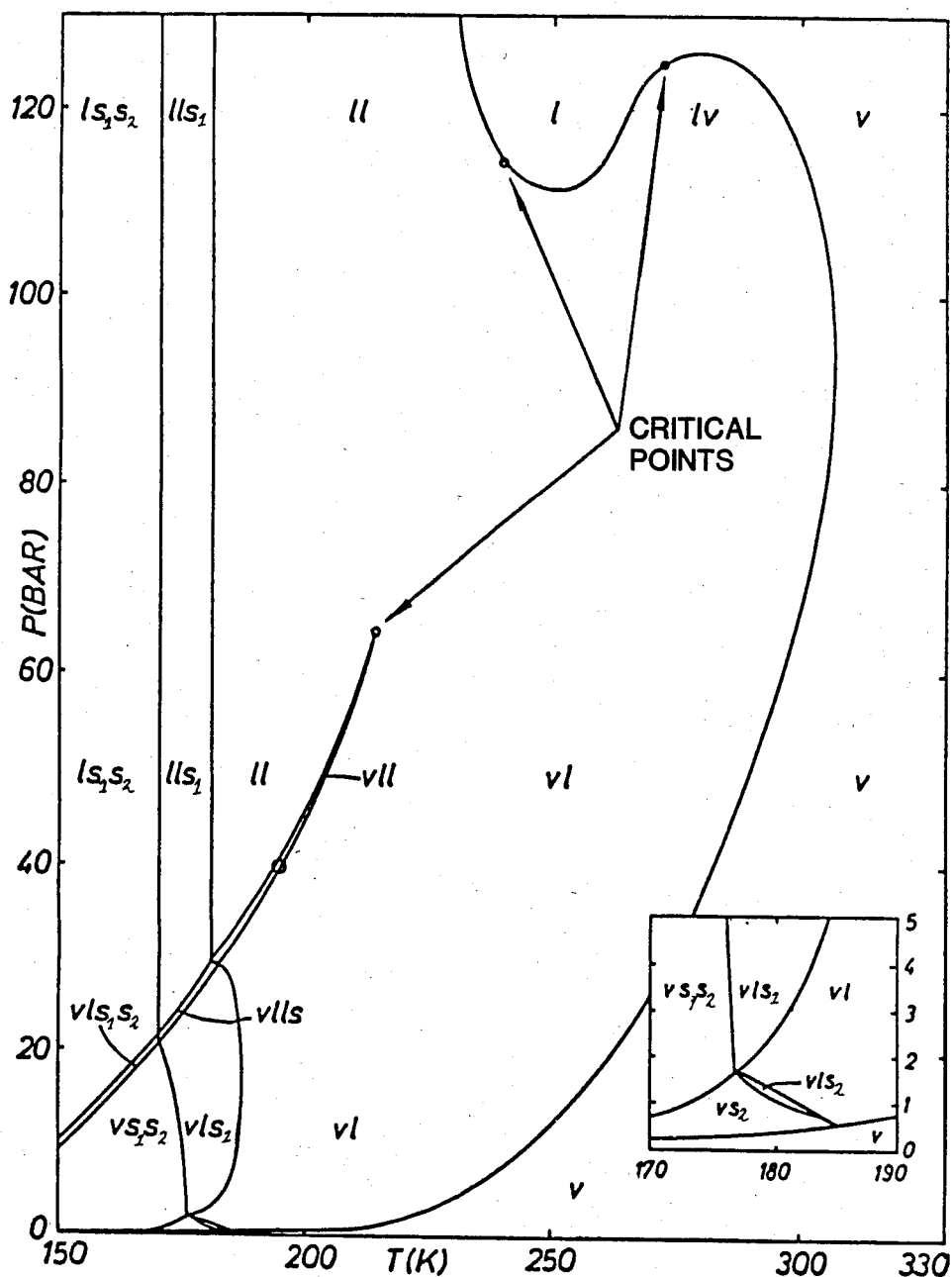
FIG. 2 is a phase diagram of the gaseous stream to be treated according to FIG. 1.

FIG. 2 illustrates the phase diagram for the feed gas with 50 mol-% $CH_4$, 40 mol-% $H_2S$, 10 mol-% $CO_2$, and 0.1 mol-% $C_2H_6$ for the process according to FIG. 1, this diagram showing the operating point of separator 4. In this diagram, the symbols represent the following:

v = vapor phase
l = liquid phase
$s_1$ = solid $H_2S$ phase $s_2$ = solid $CO_2$ phase
vl = vapor phase + liquid phase in equilibrium
ll = two liquid phases in equilibrium
lls = two liquid phases + one solid phase in equilibrium
$ls_1s_2$ = liquid phase + two solid phases in equilibrium
vls = vapor phase + liquid phase + solid phase in equilibrium
$vs_1s_2$ = vapor phase + two solid phases in equilibrium
$vls_1s_2$ = vapor phase + liquid phase + two solid phases in equilibrium By two liquid phases in equilibrium is meant two high density multicomponent fluids in thermodynamic equilibrium with identical temperatures and pressures but with differing compositions, such phases being immiscible, and having different physical properties, in particular different densities.

Figure 3:
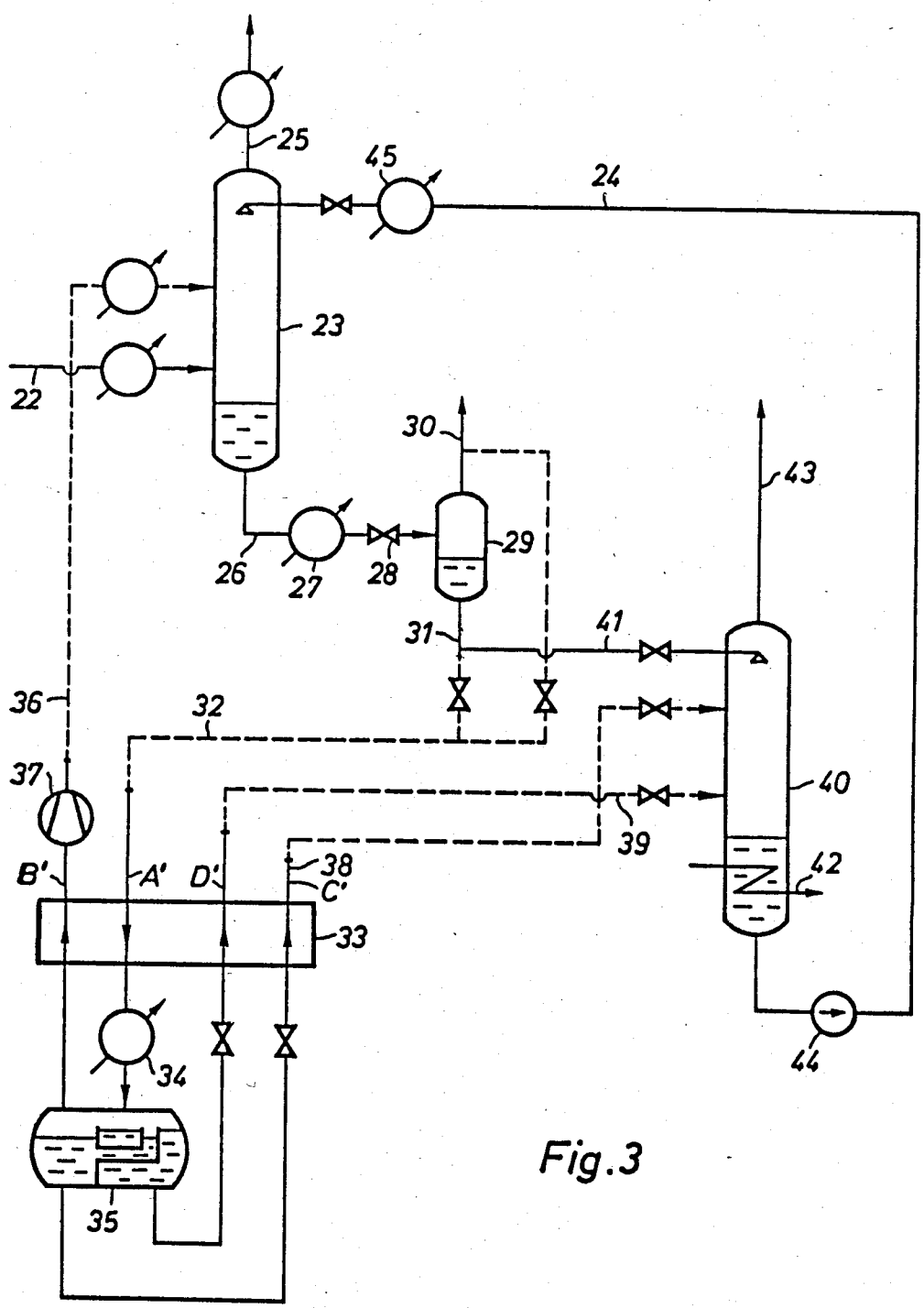
FIG. 3 is a schematic flowsheet of a preferred process scheme for the regeneration of a solvent.

According to FIG. 3, there is schematically depicted the use of the process of this invention for regeneration of a loaded solvent. A raw gas stream with 80 mol-% methane and 20 mol-% $CO_2$ is fed to a scrubbing column 23 via conduit 22 under a pressure of 60 bar and at a temperature of 240 K. In the upper zone of the scrubbing column 23, toluene, for example, is introduced via conduit 24, which will be described in greater detail below. A fraction rich in methane and containing only about 1 mol-% $CO_2$ at this point is withdrawn from the head of scrubbing column 23 via conduit 25 as the product stream.

The $CO_2$-loaded toluene leaves the scrubbing column 23 at the bottom via conduit 26 at a temperature of 240 K. and with a content of methane of 15 mol-% and $CO_2$ likewise of 15 mol-%. The toluene is heated in a heat exchanger 27 to 270 K., expanded in 28 to 54 bar, and conducted to a phase separator 29. The thus-obtained gaseous fraction containing 22% $CO_2$ and 78% $CH_4$ exits from phase separator 29 via 30. If advantageous to the subsequent separation of the mixture in separator 35, a portion of this gaseous fraction, up to 100%, is mixed together with a portion of the liquid fraction containing about 75% toluene, 14% $CO_2$ and 11% $CH_4$ from conduit 31, for example with about 3% of the entire liquid fraction produced.

The resultant mixture of the gaseous and liquid fraction is conducted via 32 into a heat exchanger 33 and cooler 34 and cooled therein to about 215 K. During this step, three phases B', C' and D' are produced according to FIG. 4, having the following compositions in mol percent:

|  | A' | B' | C' | D' |
|---|---|---|---|---|
| $CH_4$ | 60 | 85 | 35 | 20 |
| $CO_2$ | 30 | 15 | 60 | 36 |
| Toluene | 10 | 0 | 5 | 44 |
| Density ($kg/m^3$) |  | 100 | 700 | 900 |

These phases are separated in a separator 35 in correspondence with their densities, in some cases expanded for further lowering of the temperature, and thereafter heated in heat exchanger 33. In this process, the temperature should not ordinarily be lowered below 210 K. since toluene or $CO_2$ could freeze out at such temperature.

Phase B', containing almost no toluene, can be returned to scrubbing column 23 via conduit 36 with compressor 37. Phases C' and D' are expanded via conduits 38, 39 into a regenerating column 40. Furthermore, the main portion of the liquid fraction from separator 29 is expanded via conduit 41 into the regenerating column 40. By means of a sump heater 42, the $CO_2$ is driven out of the toluene and withdrawn overhead (conduit 43).

The thus-regenerating toluene, containing less than 1 mol-% $CO_2$, leaves the regenerating column at the sump and is brought to 60 bar by means of a pump 44 and recycled into scrubbing column 23 via conduit 24 and cooler 45.

In some cases, phase B' can form at such a purity that it can be obtained as the product stream.

Likewise, phase D' can even now be so pure, i.e., consist of primarily of solvent, that it is returned directly into the scrubbing column.

Moreover, there is the possibility of conducting the loaded solvent directly from the sump of the scrubbing column to the cooling stage 33 and 34 followed by phase separation according to this invention.

The warming, partial separation and subsequent partial mixing of the loaded solvent prior to the cooling stage 33 can in certain cases result in better separation of that portion of the loaded solvent which is subjected to cooling in the cooling stage 33.

Figure 4:
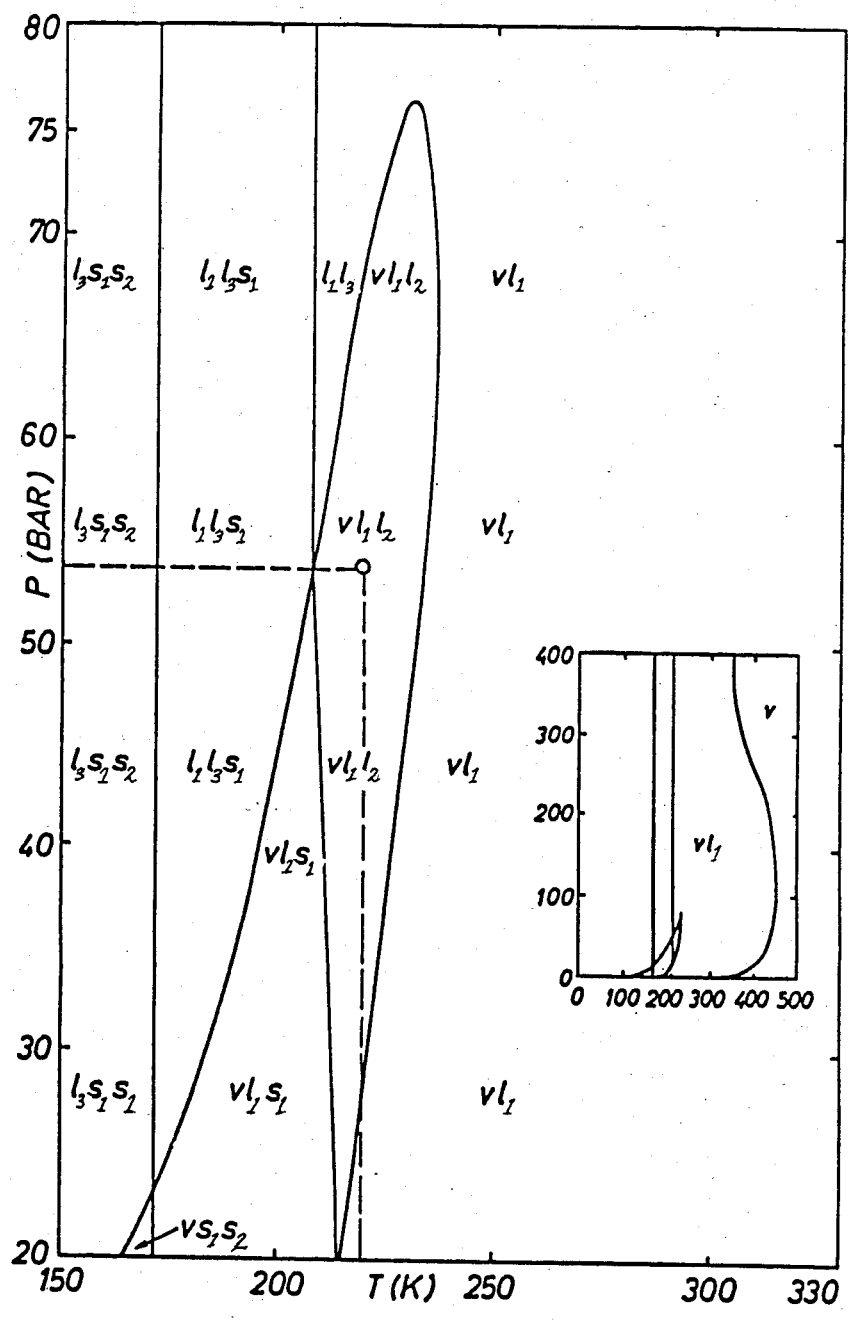
FIG. 4 is a phase diagram of the loaded solvent to be treated according to FIG. 3.

FIG. 4 illustrates the phase diagram for the gas-liquid mixture (60 mol-% methane, 30 mol-% $CO_2$, 10 mol-% toluene) utilized in the process according to FIG. 3; this diagram illustrates the operating point of separator 35. In this connection, the symbols mean the following:

$s_1$ = solid $CO_2$ phase
$s_2$ = solid toluene phase
$l_1$ = liquid phase rich in toluene
$l_2$ = liquid phase rich in $CO_2$ and
$l_3$ = liquid phase rich in methane Suitable solvents are all absorbents capable of absorbing $CO_2$ and $H_2S$, especially toluene, benzene, hexane, cyclohexane, or other $C_5$- to $C_8$-hydrocarbons or mixtures of the aforementioned absorbents. Also usable as solvents are alcohols, such as methanol, or ethers, ketones, or mixtures containing same.

The preceding embodiments can be repeated with similar success by substituting the generically or specifically described reactants and/or operating conditions of this invention for those used in the preceding embodiments.

From the foregoing description, one skilled in the art can easily ascertain the essential characteristics of this invention, and without departing from the spirit and scope thereof, can make various changes and modifications of the invention to adapt it to various usages and conditions.

I claim:

1. A process for the separation of a homogeneous, sour gas-containing fluid mixture comprising:
   cooling the homogeneous mixture to an effective temperature sufficient to obtain:
   (a) a first phase reduced in sour gas and having a low density,
   (b) a second phase enriched in sour gas and having a higher density than the first phase,
   (c) a third phase containing sour gas and having a higher density than the first and second phases; at least two of the aforementioned phases being liquid phases in equilibrium;
   separating the phases (a), (b) and (c) in correspondence with their densities;
   further subjecting at least one of phases (a), (b) and (c) for further separation and/or purification processes.

2. A process according to claim 1 wherein at least one phase having a higher density than phase (a) is introduced into a scrubbing stage.

3. A process according to claim 1 wherein the sour gas constituent substantially comprises $CO_2$ and $H_2S$.

4. A process as claimed in claim 1, wherein the fluid mixture comprises a suitable solvent having a substantial sour gas impurity content wherein at least a portion of the sour gas impurity-containing solvent is cooled to an effective temperature so as to obtain:
   (a) said first phase substantially devoid of solvent and having a low density,
   (b) said second phase having a higher density than said phase (a), containing a substantial amount of sour gas impurities and a relatively low proportion of solvent, and
   (c) said third phase of greater density than said phases (a) and (b), containing primarily solvent;
   at least two of said phases being liquid phases in equilibrium;
   separating said phases (a), (b) and (c) in correspondence with their densities;
   subjecting at least one liquid phase to subsequent regeneration stages.

5. A process as claimed in claim 4 wherein the suitable solvent is selected from a class of organic absorbent fluids capable of absorbing $CO_2$ and $H_2S$.

6. A process as claimed in claim 5 wherein the suitable solvent is toluene, benzene, hexane, or cyclohexane.

7. A process as claimed in claim 4 wherein the suitable solvent is toluene.

8. A process as claimed in claim 1 wherein the mixture is cooled to an effective temperature by heat exchange means.

9. A process as claimed in claim 1 wherein the effective temperature is above the freezing points of the impurities.

10. A process as claimed in claim 1, wherein the effective temperature is above the freezing point of the toluene solvent.

11. A process according to claim 1 further comprising withdrawing at least one of the individual phases directly as a product stream.

12. A process according to claim 1 the phases obtained wherein said at least individual phase is subjected to a scrubbing stage.

13. A process according to claim 1, further comprising withdrawing the phase depleted in sour gas as product stream.

14. A process according to claim 1 further comprising feeding at least one of the phases enriched with sour gases to a sulfur conversion stage.

* * * * *